No. 870,403.  
PATENTED NOV. 5, 1907.  
L. C. WOERNER.  
MICROMETER GAGE.  
APPLICATION FILED FEB. 5, 1907.
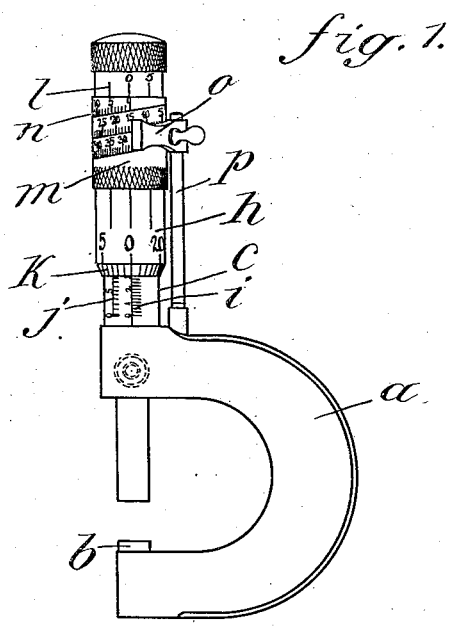
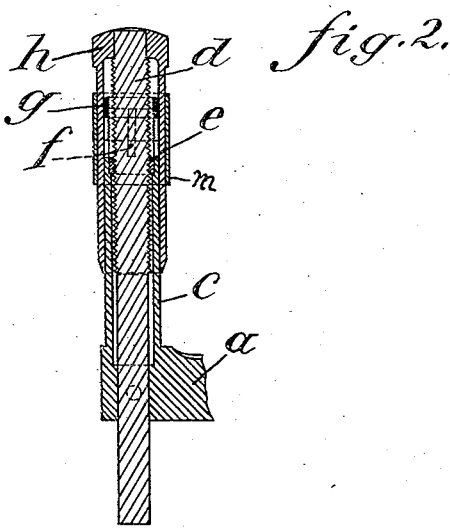
Inventor  
L. C. Woerner
Witnesses

UNITED STATES PATENT OFFICE.

LOUIS C. WOERNER, OF BERLIN, GERMANY.

MICROMETER-GAGE.

No. 870,403.

Specification of Letters Patent.

Patented Nov. 5, 1907.

Application filed February 5, 1907. Serial No. 355,789.

*To all whom it may concern:*

Be it known that I, LOUIS CHRISTIAN WOERNER, engineer, a citizen of the United States of North America, residing at 17/20 Huttenstrasse, Berlin, German Empire, have invented new and useful Improvements in Micrometer-Gages, of which the following is a specification.

My invention relates to a device which can be readily applied to any micrometer gage and enables dimensions to be read off in millimeters on a micrometer graduated into inches, or inches on a micrometer graduated into millimeters, down to the smallest fractions ($\frac{1}{100}$ mm or $\frac{1}{1000}$ in.), so that one and the same instrument can be employed for exact measurements both in millimeters and inches. To enable this to be done the hollow cap of the threaded mandrel in addition to the fixed circular graduations for reading off fractions of the one unit of measurement as determined by the pitch of the micrometer screw, is provided with a rotary and sliding scale on which, by means of a stationary index, fractions of the other unit of measurement, which is not in connection with the pitch of the screw, can be read off, after the approximate measurement in this unit has been first set by means of a second scale on the shank of the micrometer gage. For setting the zero point of the movable scale the cap of the mandrel is furnished with vertical graduations corresponding with the second scale on the hollow shank, which vertical graduations, on the micrometer being opened to the required division of the scale on the shank, come below the index.

In the accompanying drawing the invention is shown applied, by way of example, to a micrometer gage with inch graduations.

Figure 1 is a side elevation, and Fig. 2 a longitudinal section through the micrometer screw.

$a$ is the body of the gage of the well-known jaw form, which may be of cast iron. The one end has a tempered steel cheek-piece $b$ let into it, while the other end has a hollow shank $c$, forming one piece with the body and containing the micrometer screw. $d$ is the threaded mandrel; $e$ is the nut rigidly fixed in the shank $c$. The nut $e$ is provided with slits $f$ and has a thread on the outside also to receive an adjusting collar $g$. To the screw mandrel $d$ there is connected in well-known manner a hollow cap $h$, which fits over the shank $c$. The latter is provided with both inch graduations $i$ and millimeter graduations $j$. The micrometer screw is assumed to have 40 threads, so that at the divisions of the inch scale $i$ $\frac{1}{40}$ inch, and with the circular scale of 25 divisions $k$ of the cap $h$ another $\frac{1}{1000}$ inch, can be read off. The cap $h$ is furnished with a number of divisions $l$ corresponding with the millimeter scale $j$ on the shank $c$. In the actual instrument the divisions $l$ are located 2 mms. apart; in the drawing, however, for the sake of clearness, they are marked at 5 mms. apart. The divisions $l$ are so arranged, that, when the lower edge of the cap $h$ coincides with any of the divisions of the scale $j$ the corresponding division $l$ coincides with the edge of an index $o$ hereinafter described.

On the cap $h$ there is a rotary sleeve $m$, also capable of sliding in axial direction and provided with graduations $n$, which enable 2½ mms. to be read off in $\frac{1}{100}$ mm. The scale $n$ runs spirally on the sleeve $m$ as a millimeter is greater than $\frac{1}{40}$ inch to which unit the circumference of the cap $h$ is scaled. The index $o$ for the scale $n$ can be adjusted on the arm $p$ projecting from the body $a$.

If now there is to be measured, for instance, in millimeters a piece of work whose thickness is about 5 mms., the zero point of the scale $n$ must first be adjusted to the division 5 of the graduations $l$ and the cap $h$ then turned until its lower edge nearly coincides with the division 5 on the scale $j$; the cap $h$ is then to be turned until the division 5 of the divisions $l$ and thus also the zero point of the scale $n$ coincides with the edge of the index $o$. The micrometer is then opened exactly to 5 mms., the movable scale $n$ then enables a further $\frac{1}{100}$ mm. to be read off. If a piece of work having a thickness of about 10 mms. is to be measured, the zero division of the movable scale $n$ must be adjusted to the division 10 of the scale $l$ and a procedure similar to that already mentioned followed. By the addition of the movable scale $n$ it is thus possible to read direct from 0–25 mms. in $\frac{1}{100}$ mm., that is, objects of 0–25 mms., 25–50 mms., etc., can be measured exactly to $\frac{1}{100}$ mm. on the metrical scale.

The sleeve $m$ not only rotates, but also slides in axial direction, so that the rod $p$ may be kept short, to avoid the danger of its getting accidentally broken off in the workshop.

Having thus described my invention, what I claim is:—

In a micrometer gage, a hollow shank provided with inch and millimeter scales; a micrometer screw working in the shank and having a hollow cap furnished with circular graduations at the edge for reading off fractions of the unit of measurement determined by the pitch of the micrometer screw, and vertical divisions corresponding with the other unit of measurement; and a sleeve rotating and axially sliding on the cap and provided with a scale for reading off fractions of the said second unit of measurement; and an index for the scale on the sleeve; substantially as described.

In witness whereof I have hereunto signed my name this 5th day of January 1907, in the presence of two subscribing witnesses.

LOUIS C. WOERNER.

Witnesses:
 WOLDEMAR HAUPT,
 HENRY HASPER.